Figure 1:
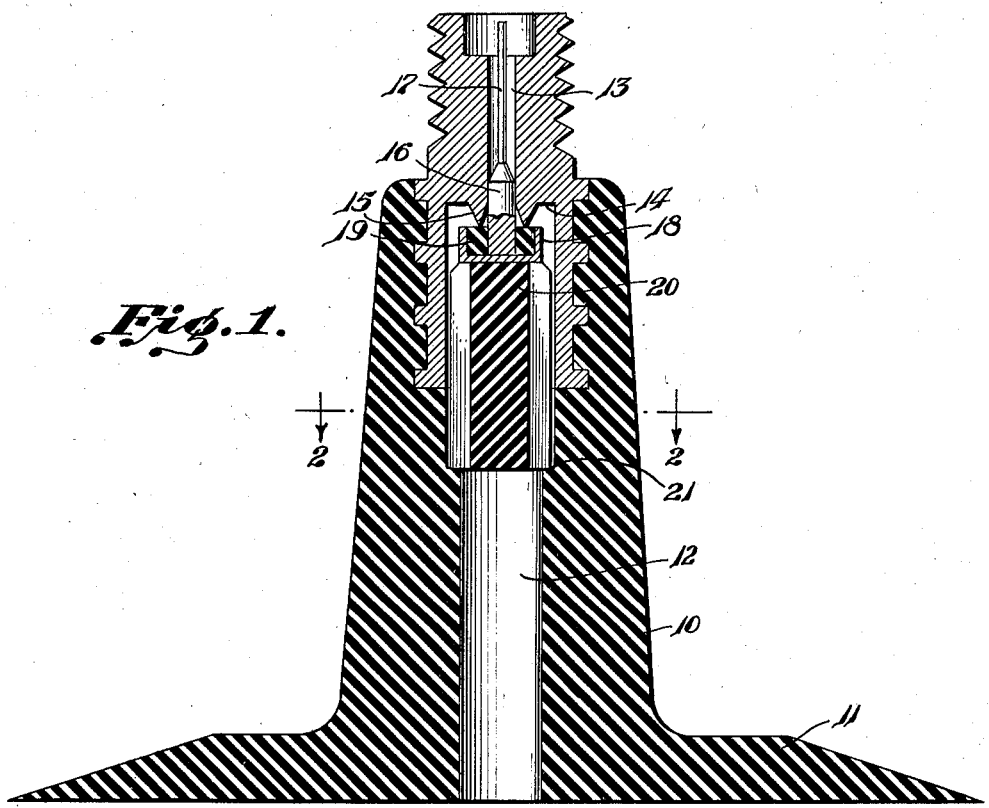

Dec. 28, 1937.  I. D. PERRY  2,103,822

TIRE VALVE AND THE LIKE

Filed Jan. 14, 1936

Inventor:
Ira D. Perry
Everett G. Clements
Atty.

Patented Dec. 28, 1937

2,103,822

UNITED STATES PATENT OFFICE 2,103,822

TIRE VALVE AND THE LIKE

Ira D. Perry, Muskegon, Mich.

Application January 14, 1936, Serial No. 59,109

3 Claims. (Cl. 152—12)

This invention relates to improvements in tire valves and the like. The improvements herein disclosed are intended to very greatly improve the tire valves both as to air-tightness, and also as to reduction of cost of manufacture, and simplication of the devices.

Generally speaking the valves herein disclosed are provided with valve stems which are attached to the inner tube of the tire, and reach outwardly therefrom through the wheel felly or to a convenient point of connection for receiving the inflating connection. In certain tire valve improvments shown and described in my United States Patent No. 2,088,248, granted July 27, 1937, there is provided a sealing arrangement in which the movable member of the valve coacts with a relatively stationary valve seat, one of these cooperating parts being of rubber, and the other being of metal or other hard material seating against the other member. As an improvement of the present application I have arranged the parts in such manner that the valve member which seats against the stationary seat is to be inserted from the inner end of the valve stem, the air passage through the stem being of sufficient size to permit this operation to be performed, as distinguished from the well known "Schrader" type in which the valve member or "core" is inserted from the outer end of the stem. Therefore it may be stated that one object of the present invention is to improve the valve by insertion of the valve member or plug from the inside instead of from the outer end of the stem, thereby eliminating the use of the threaded nut or other device, and eliminating leakage thereby.

Another object of the invention is to greatly simplify the construction of the valve, and reduce the cost of manufacture thereof very materially as compared with previous constructions.

Other objects and uses of the invention will appear from a detailed description thereof, which consists in the features of construction and combinations, hereinafter described and claimed.

Figure 2:
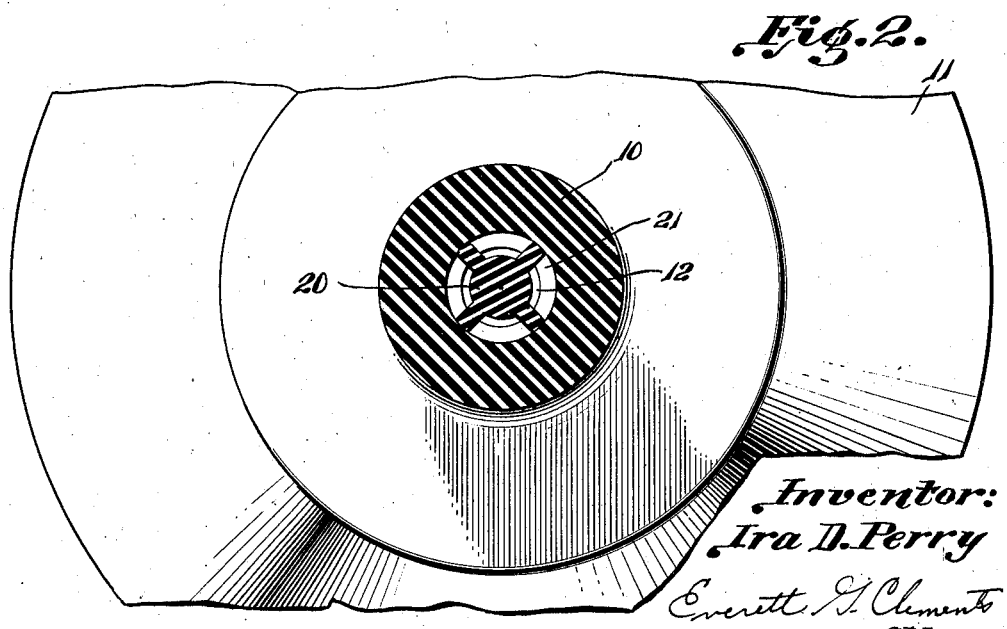

In the drawing:

Fig. 1 shows a longitudinal section through the valve stem and valve embodying the features of the present invention, and Fig. 2 is a transverse section through the valve and valve stem, taken on line 2—2 of Fig. 1.

In the drawing, the valve stem is designated generally by the numeral 10, the main body of which is composed of rubber or similar relatively elastic material and the outer end portion of which is composed of metal or other relatively hard or inelastic material. At the lower or inner end of the stem body 10 is formed a disc-like flange 11 for securing the stem to a tire tube or other inflatable article in usual manner.

The stem body 10 is provided with a through longitudinally extending passageway, the lower or inner portion 12 which extends through the rubber or relatively flexible portion of the stem is of larger diameter than the upper or outer portion 13 which extends through the relatively hard or metal end portion. At the juncture of these passageway portions 12 and 13 of different diameters is formed an inwardly facing shoulder 14, which shoulder is in turn formed with an annular flange 15 which tapers inwardly to a sharp edge surrounding the inner end of the outer passageway portion 13. This sharp edged flange 15 serves as a valve seat for the valve member 16 now to be described. This valve member includes a stem 17 of smaller diameter than the outer passageway portion 13 through which it extends from the lower or inner passageway portion 12. An upwardly and outwardly cupped head 18 is carried at the inner end of the stem 17 into which the sharp edged flange or valve seat 15 is adapted to extend. Within the cupped head 18 is fitted or molded a rubber block 19 which constitutes the seating or sealing face portion of the valve 16 and into the body of which the annular flange or valve seat 15 is forced by action of a rubber spring member 20 which in turn is yieldably supported upon an annular shouldered portion 21 of the resilient valve stem body within the lower or inner passageway portion 12.

In providing this spring support to normally maintain the valve head and seat in sealing engagement and provide ample operating space for the relatively movable parts, the portion of the inner passageway 12 is slightly enlarged in diameter between the relatively rigid shoulder portion 14 and the relatively resilient shoulder 21. Into this enlarged portion of the passageway 12 the rubber spring-like block member is forced from the lower end of the passageway 12 for supporting engagement upon the shoulder 21 to exert outward yielding pressure against the lower face of the valve head 18 in normally maintaining the valve head in engagement with the valve seat 15. The valve is thus normally supported in sealing engagement with the valve seat by the yieldable material of the valve stem body.

It is to be noted that in the arrangement herein disclosed the valve plug or member 16 is inserted and removed from the inside or inner end of the stem through the passageway 12, and that there is no need for a nut or removable member at the position of the valve seat, thereby completely eliminating leakage at that point, and simplifying the construction and materially reducing the cost of manufacture.

I claim:

1. A tire valve stem of yieldable material having a through passageway, said passageway being of larger diameter in its inner portion than in its outer portion, a tubular metal insert secured within the material of the stem and forming the outer passageway of less diameter, said insert having an annular valve seat about the inner end of the passageway through said insert, and a yieldable valve member insertable through the passageway in the inner portion of said stem and normally supported in sealing engagement with said valve seat by supporting engagement with the yieldable material of said valve stem below said insert.

2. A tire valve stem the main body of which is composed of yieldable material and through which a passageway extends, said passageway being of larger diameter throughout its inner portion than through its outer portion and providing a shoulder at the inner end of said inner portion, the outer end portion of the valve stem body forming the passageway portion of less diameter being composed of relatively inelastic material and providing a relatively rigid valve seat at the juncture of said inner and outer passageway portions, said valve seat being provided with inclined side walls projecting inwardly about the inner end of the outer passageway portion, a relatively rigid valve member having a head positioned within the inner portion of said passageway and a stem extending outwardly through said outer passageway portion and a yieldable imperforate member normally supporting said valve head in sealing engagement with said valve seat by engagement with the shoulder in the yieldable material of the inner passageway portion of the valve stem body.

3. A tire valve stem of yieldable material having a through passageway, said passageway being of larger diameter in its inner portion than in its outer portion and having a shoulder facing said outer portion, a tubular metal insert secured within the material of the stem and forming the outer passageway of less diameter, said insert having an annular valve seat about the inner end of the passageway therethrough, and a yieldable valve member insertable through the larger passageway in the inner portion of said stem for supporting engagement with said shoulder, whereby said valve member is supported in sealing engagement with the valve seat by the yieldable material of the valve stem below the valve seat carrying insert.

IRA D. PERRY.